United States Patent
Lochmann

(10) Patent No.: US 10,041,527 B2
(45) Date of Patent: Aug. 7, 2018

(54) CONNECTING ROD

(71) Applicant: Mahle International GmbH, Stuttgart (DE)

(72) Inventor: Roland Lochmann, Marbach (DE)

(73) Assignee: Mahle International GmbH (DE)

(*) Notice: Subject to any disclaimer, the term of this patent is extended or adjusted under 35 U.S.C. 154(b) by 424 days.

(21) Appl. No.: 14/346,318

(22) PCT Filed: Sep. 20, 2012

(86) PCT No.: PCT/EP2012/068544
§ 371 (c)(1),
(2) Date: Mar. 20, 2014

(87) PCT Pub. No.: WO2013/041626
PCT Pub. Date: Mar. 28, 2013

(65) Prior Publication Data
US 2014/0224061 A1 Aug. 14, 2014

(30) Foreign Application Priority Data
Sep. 21, 2011 (DE) .................. 10 2011 083 134

(51) Int. Cl.
*F16C 7/02* (2006.01)
*F16C 9/04* (2006.01)
(Continued)

(52) U.S. Cl.
CPC .............. *F16C 7/023* (2013.01); *F16C 9/04* (2013.01); *F16C 33/10* (2013.01);
(Continued)

(58) Field of Classification Search
CPC .... F16C 7/023; F16C 7/04; F16C 9/04; F16C 9/02; F16C 33/1065; F16C 33/106;
(Continued)

(56) References Cited

U.S. PATENT DOCUMENTS 1,921,044 A * 8/1933 Sparrow .................. F16C 9/04
                                                    29/898.059
1,923,597 A * 8/1933 Walker ..................... F01M 9/06
                                                    184/11.1
(Continued)

FOREIGN PATENT DOCUMENTS

DE           3614532 A1 * 11/1987  .......... F16C 33/1065
DE    102008008584 A1    8/2009
(Continued)

OTHER PUBLICATIONS

EPO Translation of the Description of DE 3614532 A1, Engel et al., Nov. 5, 1987.*
(Continued)

*Primary Examiner* — Daniel D Yabut
(74) *Attorney, Agent, or Firm* — Fishman Stewart PLLC

(57) ABSTRACT

A connecting rod for converting a linear motion of a piston into a rotational motion of a crankshaft may include a small connecting eye for connecting the connecting rod in a rotatable manner to a pin of the piston and a large connecting rod eye for connecting the connecting rod in a rotatable manner to the crankshaft. The connecting rod may include at least one eccentric lubricating groove disposed in at least one of an inner face of the large connecting rod eye, an inner face of the small connecting rod eye, and a bearing bush arranged in the small connecting rod eye. The at least one groove may have an axis inclined with respect to an axis of at least one of the respective small connecting rod eye, large connecting rod eye, and bearing bush.

19 Claims, 3 Drawing Sheets

(51) Int. Cl.
*F16C 33/10* (2006.01)
*F16J 1/16* (2006.01)
*F16J 7/00* (2006.01)
*F16C 17/02* (2006.01)

(52) U.S. Cl.
CPC ............ *F16C 33/1065* (2013.01); *F16J 1/16* (2013.01); *F16J 7/00* (2013.01); *F16C 17/02* (2013.01); *F16C 2360/22* (2013.01); *Y10T 74/2162* (2015.01)

(58) Field of Classification Search
CPC . F16C 33/1055; F16J 1/16; F16J 7/00; F01M 1/06; F01M 2011/026; F01M 2011/027; F01M 2001/086
See application file for complete search history.

(56) References Cited

U.S. PATENT DOCUMENTS

| | | | |
|---|---|---|---|
| 1,930,520 A * | 10/1933 | Kaufman | F01M 1/06 184/13.1 |
| 2,399,889 A | 5/1946 | Pittman | |
| 2,660,484 A | 11/1953 | Gerard et al. | |
| 2,673,767 A * | 3/1954 | Schoeppner | F16C 9/04 384/291 |
| 6,640,779 B1 | 11/2003 | Thiyagarajan | |
| 7,516,546 B2 * | 4/2009 | McEwan | B22F 5/00 123/197.3 |
| 2005/0155451 A1 | 7/2005 | Abeln et al. | |
| 2005/0263125 A1* | 12/2005 | Terada | F01M 1/06 123/196 R |
| 2009/0126191 A1 | 5/2009 | McEwan | |

FOREIGN PATENT DOCUMENTS

| | | | | |
|---|---|---|---|---|
| DE | 102010025067 A1 * | 1/2011 | ............... | B23P 9/00 |
| GB | 731435 A | 6/1955 | | |
| GB | 2269211 A | 2/1994 | | |
| JP | 06173937 A * | 6/1994 | | |
| JP | 06173937 A | 6/1994 | | |
| WO | WO-2005/015020 A1 | 2/2005 | | |

OTHER PUBLICATIONS

English abstract for DE102008008584.
English abstract for JP-06173937.

* cited by examiner

CONNECTING ROD

CROSS-REFERENCE TO RELATED APPLICATIONS

This application claims priority to German Patent Application No. 10 2011 083 134.7, filed Sep. 21, 2011, and International Patent Application No. PCT/EP2012/068544, filed Sep. 20, 2012, both of which are hereby incorporated by reference in their entirety.

TECHNICAL FIELD

The present invention relates to a connecting rod for converting a linear motion of a piston into a rotational motion of a crankshaft according to the preamble of claim 1. The invention also relates to an internal combustion engine having at least one such connecting rod.

BACKGROUND

US 2009/0126191 A1 discloses a generic connecting rod for converting a linear motion of a piston into a rotational motion of a crankshaft, in which the known connecting rod is connected in a rotatable manner to a pin of the piston by means of a small connecting rod eye and is connected in a rotatable manner to the crankshaft by means of a large connecting rod eye. In this case, grooves that do not run all the way round are arranged in a bearing bush introduced into the small connecting rod eye, which are intended to prevent burring at bearing edges.

SUMMARY

The present invention is concerned with the problem of specifying an improved or at least an alternative embodiment for a connecting rod of the generic type, which in particular has improved running properties.

This problem is solved according to the invention by the subject matter of the independent claims. Advantageous embodiments form the subject matter of the dependent claims.

The present invention is based on the general concept of providing at least one eccentric lubricating groove at least on a small connecting rod eye of a connecting rod, by means of which eye the latter is connected in a rotatable manner to a pin of a piston, the axis of which lubricating groove is inclined with respect to the axis of the small connecting rod eye.

In this case, "inclined" can mean that the axis of the lubricating groove runs in an inclined manner to the axis of the respective connecting rod eye by a vertical and/or a horizontal, that is, in particular only runs diagonally in one plane but is parallel to the axis in the other plane. With the lubricating groove provided according to the invention, particularly effective lubrication of the pin in the small connecting rod eye can take place, as a result of which the friction that necessarily results here can be reduced and the running properties can be improved. The at least one lubricating groove can be provided directly in the connecting rod eye or in a bearing bush arranged there. To produce the at least one eccentric and inclined lubricating groove, a conventional lathe can be used with a rotatably mounted turning tool, the cutting face of which, which is suitable for the present task, is arranged radially outwards. To produce the lubricating groove according to the invention, first the turning tool is arranged in the small connecting rod eye in such a manner that the rotation axis thereof lies on the axis of the small connecting rod eye. The turning tool can then be set in rotation, the radial dimension of the turning tool being such that no contact takes place with the inner wall of the small connecting rod eye or a bearing bush arranged therein. The rotation axis of the turning tool is then inclined to the axis of the small connecting rod eye and at the same time deflected in the orthogonal direction to the axis of the small connecting rod eye, so the direction of the rotation axis of the turning tool runs diagonally to the direction of the axis of the small connecting rod eye. It is advantageous in this case if the alignment of the rotation axis of the turning tool is selected such that the at least one lubricating groove is interrupted on a load side of the connecting rod eye. At the same time, the at least one lubricating groove can run over the equator and the zenith of the connecting rod eye. With the lubricating groove provided according to the invention in the small connecting rod eye of the connecting rod, the lubrication in this region can be much improved and thus the friction considerably reduced. Such a lubricating groove can generally also be arranged in the same manner in the large connecting rod eye or in a bearing bush provided there. The large connecting rod eye is usually configured as a "cracked" connecting rod eye.

In an advantageous development of the solution according to the invention, the at least one lubricating groove has a rounded groove bottom. Such rounded geometries generally reduce the notch effect and for this reason make the connecting rod more resistant to wear. The selected eccentricity of the at least one lubricating groove also makes the latter come to an end very smoothly, as a result of which an oil pressure buildup is not impaired much and oil suction out of the lubricating groove is promoted.

In an advantageous development of the solution according to the invention, at least one lubricating groove exits on an axial side of the connecting rod eye. This exiting of the at least one lubricating groove promotes an oil flow within the lubricating groove and thereby improves the lubrication effect. Common to all the embodiments is that the lubrication is promoted by the selected arrangement and the selected profile of the at least one lubricating groove and thus the smooth running properties of an internal combustion engine equipped with such a connecting rod can be improved.

Expediently, at least one inflow bore is provided to supply the at least one lubricating groove with lubricant. Such an inflow bore allows optimal supply of the lubricating groove with lubricant, for example with oil, as a result of which the friction is reduced and the smooth running properties can be increased.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
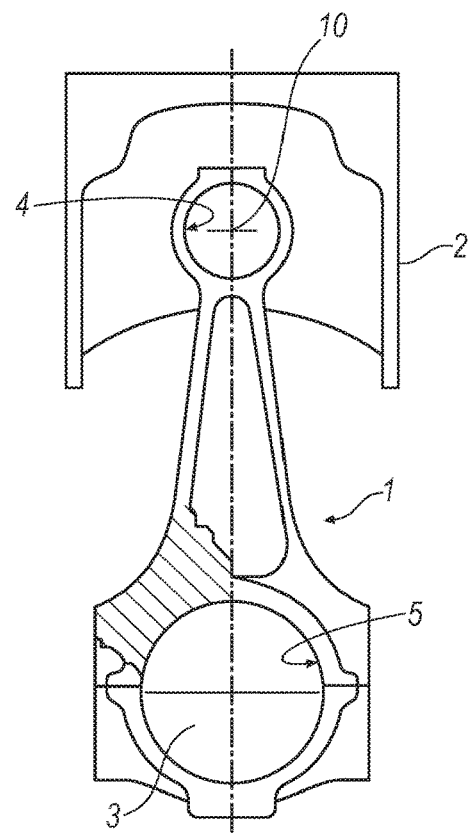
FIG. 1 schematically shows a connecting rod according to the invention with a piston attached thereto, FIG. 2 schematically shows a geometric diagram of the eccentricity of the eccentric lubricating groove, FIG. 3A schematically shows a small connecting rod eye with a bearing bush arranged therein and a lubricating groove which is eccentric, bidiagonal and open towards the axial side, FIG. 3B schematically shows a diagram as in FIG. 3A, but with a lubricating groove that is eccentric, helical and open towards the axial side, FIG. 3C schematically shows a diagram as in FIG. 3C, but with a lubricating groove that is eccentric, helical, closed and open towards the axial side, FIG. 4A schematically shows a further diagram of a possible embodiment of the lubricating groove without an additional bearing bush, FIG. 4B schematically shows a diagram as in FIG. 4A, but with an inflow bore for lubricant.

According to FIG. 1, a connecting rod 1 according to the invention, which is usually referred to as a con rod or push rod, for converting a linear motion of a piston 2 into a rotational motion of a crankshaft 3 has two connecting rod eyes 4, 5. The connecting rod eye 4 is referred to as the small connecting rod eye 4 and connects the connecting rod 1 rotatably to a pin of the piston 2, whereas the connecting rod eye 5 is referred to as the large connecting rod eye 5 and is connected rotatably by means of the latter to the crankshaft 3. The small connecting rod eye 4 is closed or configured as a closed bearing, whereas the large connecting rod eye 5 is configured as a split bearing (sawn or cracked). According to the invention, at least one eccentric lubricating groove 8 is provided on at least one inner face of the small connecting rod eye 4 or of a bearing bush 7 arranged therein (cf. FIGS. 3 to 4B), the axis 9 of which groove is inclined to the axis 10 of the small connecting rod eye 4. In this case, "inclined" can mean that the axis 9 is inclined with respect to the axis 10 of the respective connecting rod eye 4, 5 by a vertical and/or a horizontal, that is, in particular only runs diagonally in one plane but is parallel to the axis 10 in the other plane. The axis 10 of the small connecting rod eye 4 runs perpendicularly to the image plane according to FIG. 1. Of course, such a lubricating groove 8 can also be arranged in the same manner in a bearing bush 7 in the large connecting rod eye 5 or directly in the large connecting rod eye 5.

Figures 3A, 3B, 3C:
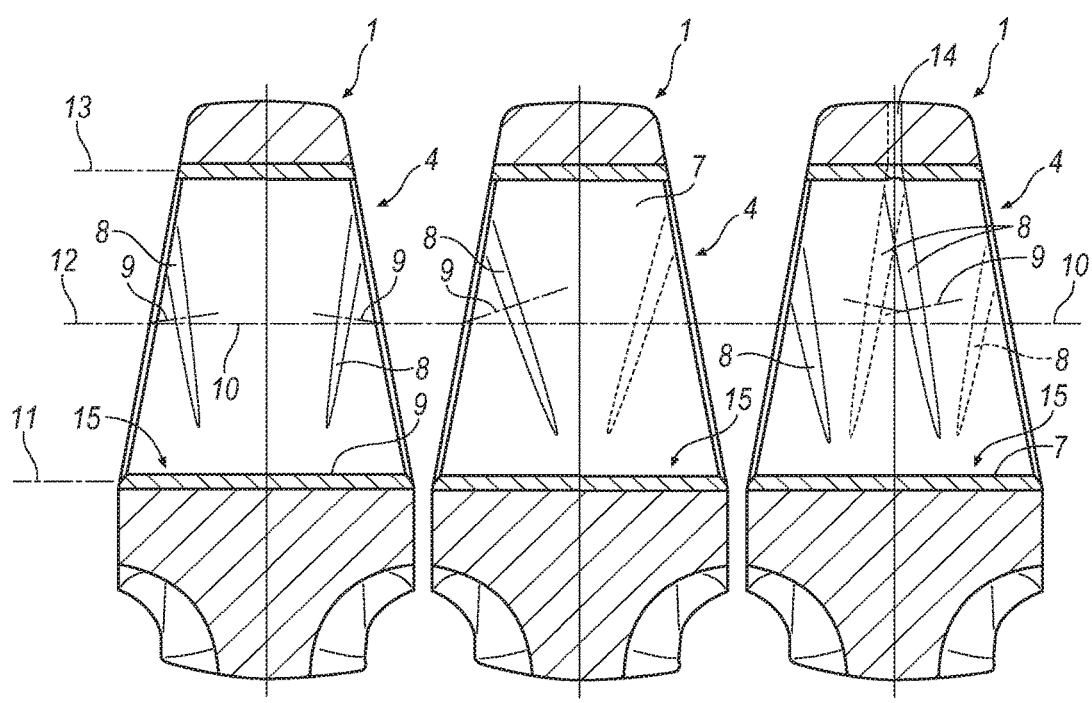

The at least one lubricating groove 8 can have a rounded groove bottom, as can be seen for example in FIG. 3C. Such rounded geometries reduce in particular the notch effect that affects susceptibility to failure. It can be seen in FIG. 3A to 3C that the lubricating groove 8 is interrupted on a load side 15, that is, on the nadir 11 (bottom) and extends merely over the equator 12 and the zenith 13 (cf. FIG. 3c). The at least one lubricating groove 8 covers a circumferential angle of more than 180°, preferably an angle of 240 to 300°. The eccentric arrangement of the lubricating groove 8 allows in particular the oil supply in the part under high loads to be greatly improved and thereby the friction to be considerably reduced. The lubricating grooves 8 have a depth of approx. 1 to 100 μm and can therefore be produced advantageously compared to oil pockets and slots. The eccentric arrangement of the lubricating grooves 8 also allows the groove to come to an end very smoothly, as a result of which the buildup in oil pressure is not impaired very much and at the same time the oil suction out of the lubricating groove 8 is promoted.

Figure 2:
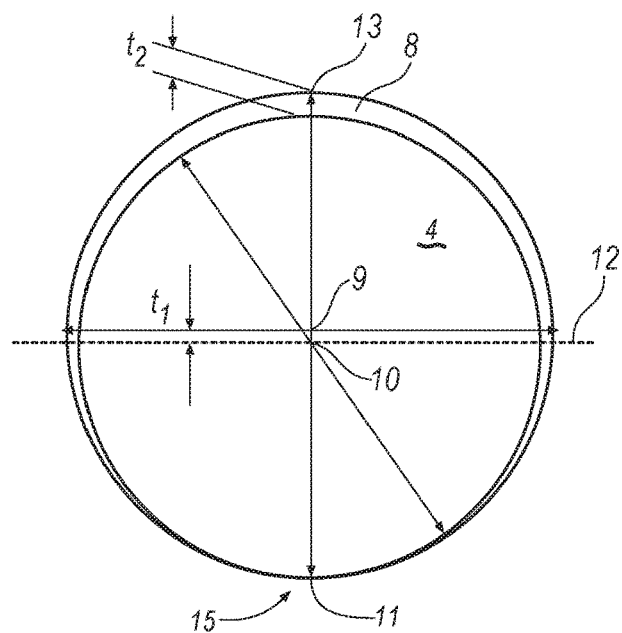

The production of the at least one lubricating groove 8 can be carried out using a conventional lathe with a rotatably mounted turning tool, the cutting face of which, which is suitable for the present task, is arranged radially outwards. To produce the at least one lubricating groove 8, first the turning tool is arranged in the small connecting rod eye 4 in such a manner that the rotation axis thereof lies on the axis 10 of the small connecting rod eye 4. The turning tool is then set in rotation, the radial dimension of the turning tool being selected to be such that no contact takes place with the inner wall of the small connecting rod eye 4 or with the inner wall of the bearing bush 7 arranged in the connecting rod eye 4. The rotation axis of the turning tool is then displaced in the direction in which the lubricating groove 8 is provided. This direction runs diagonally to the axis 10, as a result of which the lubricating groove 8 increases in depth over the equator 12 towards the zenith 13 and decreases in depth on the opposite side from the zenith 13 to the equator 12. On the load side 15, that is, the nadir 11, the lubricating groove 8 is not present at all, since it already comes to an end between the equator 12 and the nadir 11. It can be seen in FIG. 2 that the lubricating groove 8 has a depth $t_2$ in the zenith 13 that is twice the size of the vertical axial displacement $t_1$ at the equator 12. The depth of the lubricating groove 8 increases just above the load side 15, that is, just above the nadir 11 over the equator 12 towards the zenith 13 and smoothly comes to an end on the opposite side over the equator 12 to the nadir 11. The angle of the eccentricity of the lubricating groove 8 can be adapted to the direction of the main load, producing the advantage of an uninterrupted buildup of lubricating film in the region of the bearing under high load, and the maximum possible support area of the bore face or of the bearing bush 7 is used. The oil supply in the region under high load can be further improved by eccentric multiple grooves or a plurality of eccentric lubricating grooves 8, even having different groove depths. Eccentric lubricating grooves 8 having a small depth of approx. 1 to 100 μm can be produced advantageously compared to oil pockets and slots. A circumferential angle over which the lubricating groove 8 extends is usually 180 to 360°, typically 240 to 300°. Because the groove comes to an end very smoothly in the region between the equator 12 and the nadir 11, the buildup of lubricating pressure is not impaired very much and the oil suction out of the lubricating groove is additionally promoted.

Owing to the diagonal profile of the axis 9 of the lubricating groove 8 to the axis 10 of the small connecting rod eye 4, the lubricating groove is open towards an axial side of the connecting rod eye 4 and thereby produces a self-aspirating oil supply, as can be seen in FIG. 3A to 3C.

According to FIG. 3A, the lubricating groove 8 is eccentric, bidiagonal and open towards the axial side of the connecting rod eye 4, whereas the lubricating groove 8 according to FIG. 3B is eccentric, helical and open towards the axial side of the small connecting rod eye 4. In contrast, the lubricating groove 8 according to FIG. 3C is eccentric, helical, closed, and at the same time open towards the axial side. According to FIG. 3A to 3C, the small connecting rod eye 4 has a trapezoidal cross section, this being provided purely optionally. "Helical" means in this case an axis 9 of the lubricating grooves 8 that runs parallel to the axis 10 of the small connecting rod eye 4 and to the axis 10 of the bearing bush 7. Of course, a spirally running lubricating groove 8 can generally also be provided, as is indicated in FIG. 3C.

The lubricating effect in the small connecting rod eye 4 or in a bearing bush 7 arranged there can be greatly improved with the lubricating groove 8 according to the invention, which is arranged eccentrically and runs diagonally to the axis 10 of the connecting rod eye 4, as a result of which the friction in this region can be reduced and the smooth running properties of the internal combustion engine can be improved.

Figures 4A, 4B:
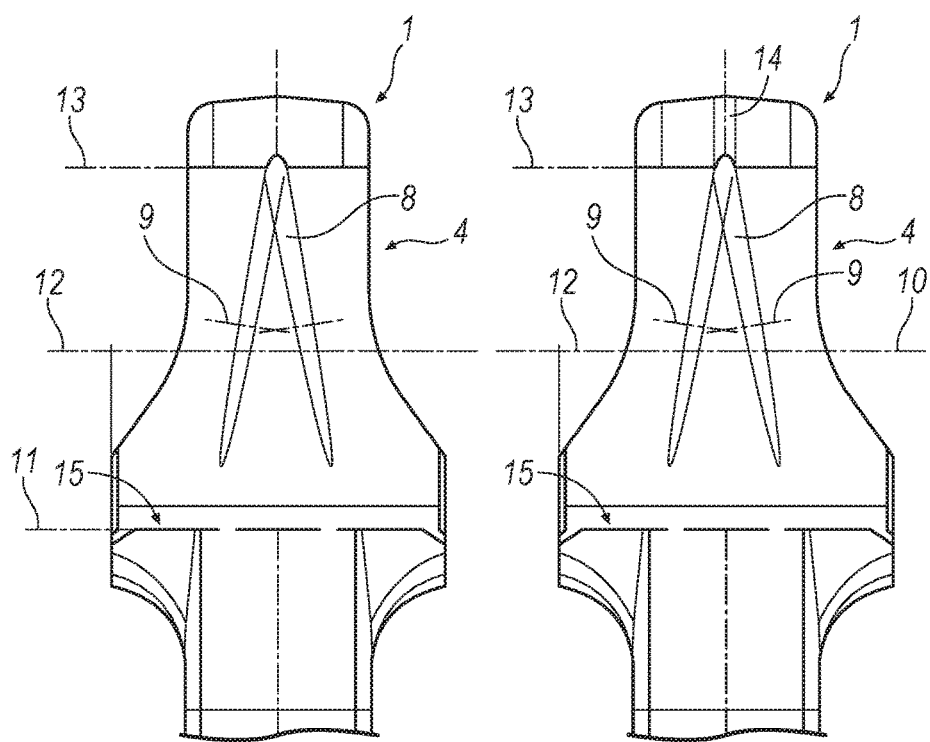

FIGS. 4A and 4B show a further embodiment of a possible lubricating groove 8, which in this case has an eccentric and bidiagonal configuration. A bearing bush 7 is not provided, so the lubricating groove(s) 8 are introduced directly into the connecting rod eye 4. The lubricating groove 8 according to FIG. 4B has an inflow bore 14, by means of which lubricant can be supplied. In contrast the lubricating groove 8 according to FIG. 4A is configured as a closed lubricating groove 8. Such an inflow bore 14 can of course also be provided with other lubricating groove geometries, for which reason such an inflow bore 14 is also shown with dashed lines in FIG. 3C. In this case the inflow bore 14 must of course also penetrate the bearing bush 7.

Of course, the statements made above for the small connecting rod eye 4 can also be applied to the large connecting rod eye 5, the latter usually being configured, in contrast to the small connecting rod eye 4, not as a closed bearing but as a split bearing having two bearing halves. All the configurations of the lubricating groove 8 made with regard to the small connecting rod eye 4 in the description and in the claims can thus be applied unchanged to the large connecting rod eye 5. The shape of the small connecting rod eye 4 can also differ from the trapezoidal shape shown (cf. FIG. 3A to 3C) and can for example have a cylindrical or stepped shape.

The invention claimed is:

1. A connecting rod for converting a linear motion of a piston into a rotational motion of a crankshaft, comprising:
   a connecting rod eye for rotatably connecting to a receiving component, the connecting rod eye having an inner face extending about an axis;
   at least one lubricating groove disposed in the inner face of the connecting rod eye, the at least one lubricating groove extending circumferentially along the inner face about a groove axis, wherein the groove axis of the at least one lubricating groove is arranged eccentric to the axis of the inner face such that the at least one lubricating groove is interrupted in a circumferential direction on a load side of the connecting rod eye and extends over an equator and a zenith of the connecting rod eye, and the groove axis of the at least one lubricating groove runs inclined to the axis of the inner face such that the at least one lubricating groove has a depth in a radial direction that increases from a region between the equator and a nadir of the connecting rod eye over the equator and towards the zenith of the connecting rod eye;
   wherein the at least one lubricating groove covers a circumferential angle of greater than 180°; and
   wherein the depth of the at least one lubricating groove is greatest at the zenith and decreases in the circumferential direction towards the load side until the at least one lubricating groove ends in the region between the nadir and the equator.

2. The connecting rod according to claim 1, wherein at least one of:
   the at least one lubricating groove has a rounded groove bottom; and
   the groove axis of the at least one lubricating groove is inclined with respect to the axis of the inner face of the connecting rod eye by at least one of a vertical plane and a horizontal plane.

3. The connecting rod according to claim 1, wherein the connecting rod eye has a tapering.

4. The connecting rod according to claim 1, wherein the load side is disposed at the nadir of the connecting rod eye, and wherein the at least one lubricating groove runs diagonally to the axis of the inner face from the region between the nadir and the equator to the zenith.

5. The connecting rod according to claim 1, wherein at least one of:
   the at least one lubricating groove exits on an axial side of the connecting rod eye; and
   at least one inflow bore is provided to supply the at least one lubricating groove with lubricant.

6. The connecting rod according to claim 1, wherein at least one of a plurality of lubricating grooves are disposed in the inner face of the connecting rod eye including the at least one lubricating groove, and the at least one lubricating groove is structured as a spirally running lubricating groove.

7. The connecting rod according to claim 1, wherein the at least one lubricating groove includes a configuration that is one of (i) bidiagonal and open towards an axial side of the connecting rod eye, (ii) helical and open towards an axial side of the connecting rod eye, and (iii) helical and closed towards an axial side of the connecting rod eye.

8. The connecting rod according to claim 1, wherein the groove axis of the at least one lubricating groove is disposed offset from the axis of the inner face between the equator and the zenith of the connecting rod eye.

9. The connecting rod according to claim 1, wherein the connecting rod eye is at least one of a small connecting rod eye and a large connecting rod eye.

10. The connecting rod according to claim 1, further comprising a bearing bush arranged in the connecting rod eye, wherein the bearing bush defines the inner face.

11. The connecting rod according to claim 1, wherein the circumferential angle covered by the at least one lubricating groove is 240° to 300°.

12. A connecting rod for converting a linear motion of a piston into a rotational motion of a crankshaft, comprising:
   a connecting rod eye for rotatably connecting to a receiving component, the connecting rod eye having an inner face extending about an axis;
   at least one lubricating groove disposed in the inner face of the connecting rod eye, the at least one lubricating groove extending circumferentially along the inner face about a groove axis, wherein the groove axis of the at least one lubricating groove is arranged eccentric to the axis of the inner face such that the at least one lubricating groove is interrupted in a circumferential direction on a load side of the connecting rod eye and extends over an equator and a zenith of the connecting rod eye, and the groove axis of the at least one lubricating groove runs inclined to the axis of the inner face such that the at least one lubricating groove has a depth in a radial direction that increases from a region between the equator and a nadir of the connecting rod eye over the equator and towards the zenith of the connecting rod eye;
   wherein the at least one lubricating groove covers a circumferential angle of greater than 180°; and wherein the load side is disposed at the nadir of the connecting rod eye and the at least one lubricating groove ends in the region between the nadir and the equator, and wherein the at least one lubricating groove runs diagonally to the axis of the inner face from the region between the nadir and the equator to the zenith.

13. An internal combustion engine, comprising: at least one connecting rod, a piston and a crankshaft, the at least one connecting rod including:
   a small connecting rod eye for connecting the connecting rod in a rotatable manner to a pin of the piston;
   a large connecting rod eye for connecting the connecting rod in a rotatable manner to the crankshaft, wherein the small connecting rod eye and the large connecting rod eye respectively have an inner face extending about an axis; and
   at least one lubricating groove disposed in the inner face of at least one of the small connecting rod eye and the large connecting rod eye, the at least one lubricating groove extending along the inner face circumferentially about a groove axis, wherein the groove axis of the at least one lubricating groove is arranged eccentric to the axis of the inner face such that the at least one lubricating groove extends over an equator and a zenith of the at least one of the small connecting rod eye and the large connecting rod eye and ends between the equator and a nadir of the at least one of the small connecting rod eye and the large connecting rod eye, and the groove axis runs inclined to the axis of the inner face such that the at least one lubricating groove has a depth in a radial direction that decreases from the zenith to the equator and towards the nadir until the at least one lubricating groove ends between the nadir and the equator; and
   wherein the at least one lubricating groove covers a circumferential angle of greater than 180°, and the at least one lubricating groove is interrupted in a circumferential direction on a load side of the at least one of the large connecting rod eye and the small connecting rod eye, the nadir being arranged at the load side.

14. The internal combustion engine according to claim 13, further comprising a bearing bush arranged in the small connecting rod eye, wherein the bearing bush defines the inner face of the small connecting rod eye and the at least one groove is disposed in the bearing bush.

15. The internal combustion engine according to claim 13, wherein at least one of:
   the groove axis of the at least one lubricating groove is inclined by at least one of a vertical plane and a horizontal plane with respect to the axis of the inner face of the at least one of the small connecting rod eye and the large connecting rod eye; and
   the small connecting rod eye defines a tapering.

16. The internal combustion engine according to claim 13, wherein at least one of:
   the at least one lubricating groove exits on an axial side of the at least one of the large connecting rod eye and the small connecting rod eye; and
   at least one inflow bore is provided in the at least one connecting rod to supply the at least one lubricating groove with lubricant.

17. The internal combustion engine according to claim 13, wherein the at least one lubricating groove has a rounded groove bottom.

18. The internal combustion engine according to claim 13, wherein the groove axis of the at least one lubricating groove is disposed offset from the axis of the inner face between the equator and the nadir.

19. The internal combustion engine according to claim 13, wherein the circumferential angle covered by the at least one lubricating groove is 240° to 300°.

* * * * *